United States Patent [19]

Moore

[11] 4,373,229
[45] Feb. 15, 1983

[54] FASTENING SYSTEM FOR ASSIST STRAPS AND THE LIKE

[75] Inventor: Ronald D. Moore, Grosse Pointe, Mich.

[73] Assignee: Chivas Products, Limited, Sterling Heights, Mich.

[21] Appl. No.: 156,602

[22] Filed: Jun. 5, 1980

[51] Int. Cl.³ ............................................. A47B 95/02
[52] U.S. Cl. ...................................... 16/125; 296/71; 5/466
[58] Field of Search ...................... 16/128 A, 169, 125; 296/71; 105/354; 411/187, 188, 189, 143, 144, 145, 184; 5/466

[56] References Cited

U.S. PATENT DOCUMENTS

| 2,251,560 | 8/1941 | White | 411/144 |
| 3,183,549 | 5/1965 | Hammesfahr | 16/125 |
| 3,438,416 | 4/1969 | Thurston | 411/143 |

FOREIGN PATENT DOCUMENTS

| 1176012 | 8/1964 | Fed. Rep. of Germany | 16/125 |
| 1779991 | 4/1973 | Fed. Rep. of Germany | 16/125 |

Primary Examiner—Andrew V. Kundrat
Attorney, Agent, or Firm—Townsend and Townsend

[57] ABSTRACT

An improved fastening system for automobile assist straps and the like using a threaded fastener having deep recesses on the surface which bears upon the strap component to be secured. The strap component has correlative ridges which mate with the recesses on the threaded fastener to resist rotation of the fastener.

8 Claims, 7 Drawing Figures

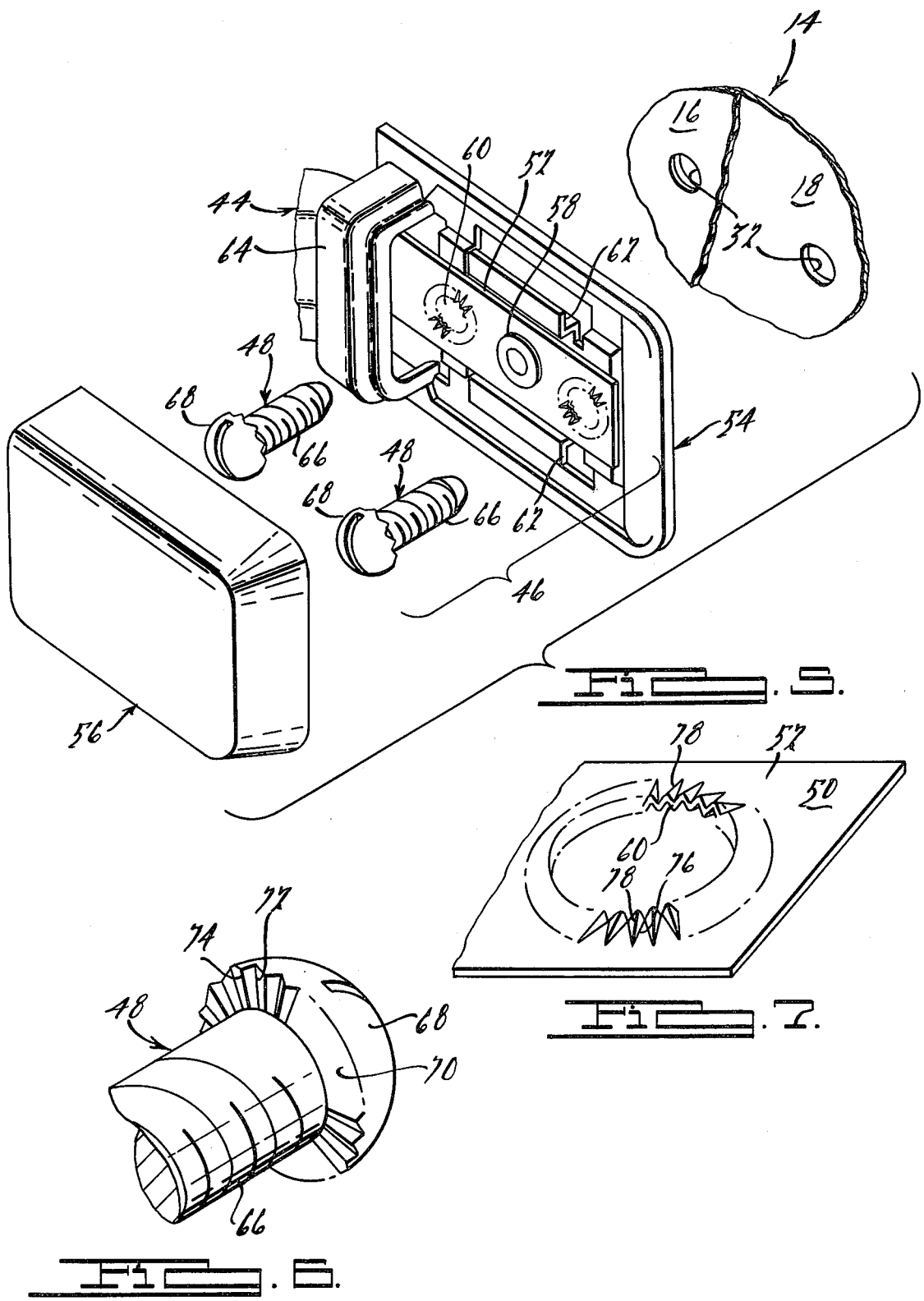

FASTENING SYSTEM FOR ASSIST STRAPS AND THE LIKE

BACKGROUND AND SUMMARY OF THE INVENTION

The present invention relates to assist straps for automobiles and the like. Such assist straps are in wide use and are both decorative and functional. As to function, the assist straps are located strategically within the vehicle, e.g., on the back of the front seats of the vehicle, above the doors of the vehicle, on the inside panel of the doors of the vehicle, and/or adjacent the doors of the vehicle. In use, the occupants of the vehicle tend to exert forces on the straps in nearly every conceivable direction, at times pulling outwardly on the straps, at times pushing downwardly on the top of the straps, at times pushing upwardly on the straps and at times applying such forces in combination or in sequence. These forces are reoccuring over the life of the vehicle. By virtue of these reoccurring forces, a small, but significant, percentage of these assist straps become loose at their attachment points. Any such looseness not only detracts from the decorative appearance of the straps, but more importantly, detracts from the secure feel of the straps. Moreover, in view of the very prominent nature of the straps in the interior of the vehicle, and the frequency with which these straps are either observed or used, looseness of the mounts for these straps has a deleterious effect on the vehicle owner's appreciation of his vehicle and his perception of the quality of the vehicle. Thus, the reputation of the manufacturer of the vehicle is affected by this problem, at least to some degree. In all the years in which this problem has been experienced by the automobile manufacturers and users, no acceptable solution has been devised.

Although many lock-type fasteners are presently known which would alleviate the problem of loose assist straps, none are believed to constitute a commercially-acceptable solution to the above problem. It must be borne in mind that these assist straps are attached in massive quantities. Some popular vehicles use as many as nine assist straps. Consequently, the high volume of production must be accommodated in any commercially-acceptable solution to this problem.

Generally speaking, a solution to this problem should not require the addition of a part to the strap-fastening structure. For example, the use of a lock-washer, star-washer or the like would not only involve additional costs for the additional part, but would complicate the movement of parts to the assembly line and the manipulations of the assembler at the assembly line. Furthermore, whenever an additional part is required, there always exists the possibility that the part will be inadvertently omitted in the assembly process.

Complicating this problem is the fact that the threaded fasteners used to secure assist straps often bear upon relatively soft materials such as injected-molded plastics or die-cast soft metals. Many of the currently-available lock systems for fasteners are either not effective on such soft materials or tend to erode those materials. It will be appreciated that a lock-system must be effective on such soft materials and must not deleteriously deform or erode the soft material.

Considering the current substantial life of an automobile, the many cycles of application of considerable forces to assist straps, the variety of directions through which these forces are applied, the variety of sequences of application of these directional forces, and the problems of cost and mass production, it is readily understood why this problem has existed for so long without a commercially-acceptable solution. It is believed that the present invention provides a commercially-acceptable solution to the problem of loosening of the assist strap mounting structures. In particular, it does not require any additional fastening parts, can be implemented using existing assembly techniques and equipment, requires little change in the tooling used to manufacture the sub-components of the assist strap fastening structure, can be used with relatively-soft materials such as injection molded plastics and die cast metals, and is relatively inexpensive to implement. Moreover, the present fastener lock system allows removal of the strap should the strap need replacement.

In essence, the present invention utilizes the same type of threaded fasteners previously used to secure the assist straps. However, one surface of the fastener is provided with relatively-deep grooves or recesses and the mating surface of the assist strap component is provided with correlative ridges or peaks which mate with the grooves or recesses on the threaded fastener. The depth of the recesses, and the angles thereof, are selected to provide a "camming" action which increases the force required to back off the threaded fastener, yet does not damage the threaded fastener or the mating strap component. The ridges and recesses may be slightly rounded when the mating component is made of a soft material such as injected-molded plastic or die-cast metal to avoid substantial gouging or erosion of the mating component. It is believed that this solution to a long standing problem is not only efficient and effective, but is also elegant in its simplicity.

Other features and advantages of the present invention will be made apparent in view of the following detailed description of the preferred embodiments.

BRIEF DESCRIPTION OF THE DRAWINGS

FIG. 5 is a perspective, exploded view of the various components of a second embodiment of the fastening system of the present invention;

FIG. 6 is a perspective view of a round-headed threaded fastener shown in FIG. 5; and FIG. 7 is a view of a portion of an assist strap shown in FIG. 5.

DETAILED DESCRIPTION OF THE PREFERRED EMBODIMENTS

Figure 1:
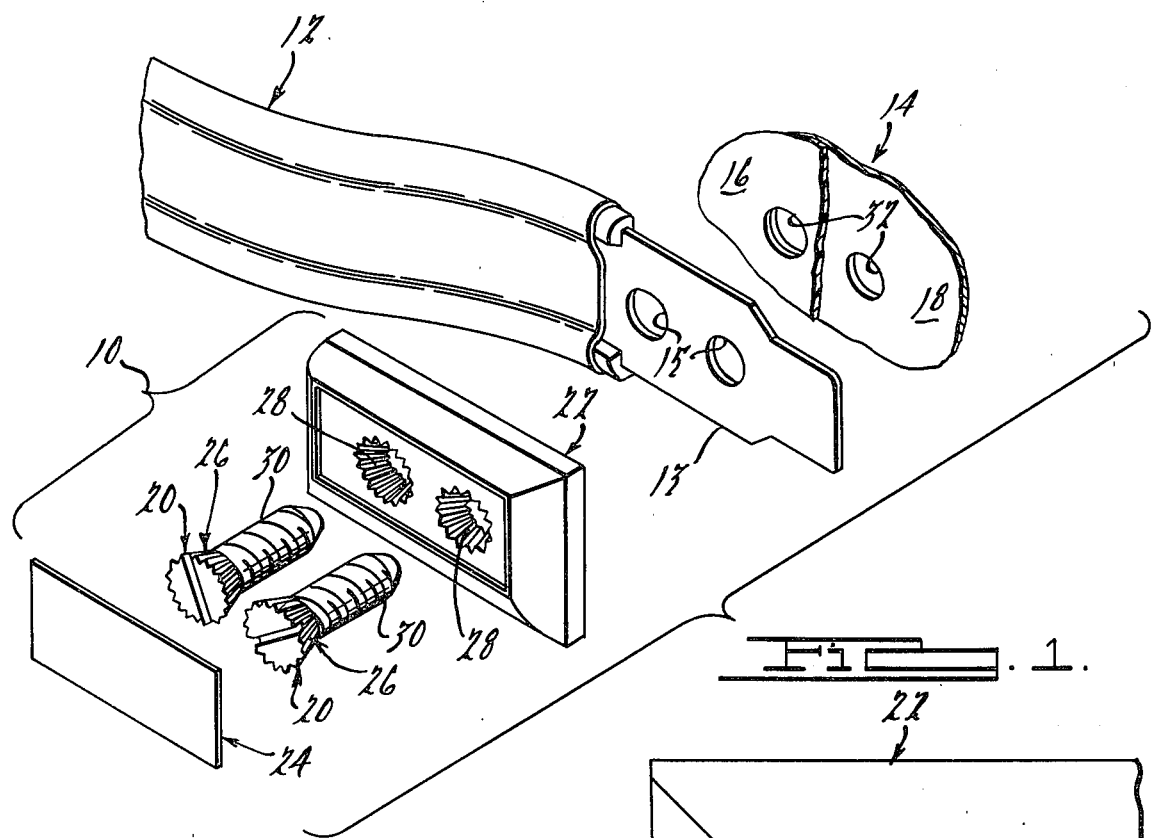
FIG. 1 is a perspective, exploded view of the various components of the fastening system of the present invention.

In FIG. 1, an exemplary fastening system 10 according to the present invention is illustrated. The fastening system 10 is used to fasten an assist strap 12 to a panel 14 in an automobile or the like. The panel 14 has a decorative overlay 16 which may be vinyl, vinyl and pressboard, cloth, etc. The panel 14 also has a metal plate or backing 18 which serves as the principal support element for the assist strap 12. The exemplary fastening system 10 includes a pair of threaded fasteners 20 and a decorative escutcheon 22. A decorative panel 24 is provided to overlie and conceal the fasteners 20. The panel 24 may be secured to the escutcheon 22 by adhesive or the like. Alternatively, a construction as shown in my copending application Ser. No. 156,820 entitled "Vehicle Assist Strap" and filed on the same day as this application may be used.

The threaded fasteners 20 feature surfaces 26, generally defining a truncated cone, which underlie the head of the fastener 20 and which have relatively-deep grooves or recesses (illustrated in detail hereinafter). The surfaces 26, and the grooves or recesses therein, mate with corresponding surfaces 28 which surround the openings in the escutcheon 22. Notice that the surfaces 28 are of a complimentary configuration with respect to the surfaces 26 and therefore feature corresponding ridges or peaks. The grooves and ridges in the surfaces 26 and 28 provide the locking feature of this invention. In this regard, the term "locking" is a relative term and is not intended to express an absolute locking effect since the purpose of the surfaces 26 and 28 is to substantially increase the force required to loosen the threaded fasteners 20, but not to absolutely prevent the removal of the threaded fasteners 20. In fact, it is desirable to permit the removal of the threaded fasteners by an increased rotative force designed to overcome the "camming" effect provided by the ridges and peaks on the surfaces 26 and 28. Such removal facilitates repair or replacement of the assist strap 12.

The threaded fasteners 20 have a threaded portion 30 which is designed to threadedly engage openings 32 in the panel 14. For example, the threaded fasteners 20 may be of the thread-cutting or self-threading variety which cuts corresponding threads in the metal backing 18 of the panel 14. Alternatively, the metal backing 18 may be provided with threaded openings 32 which engage the threads on the threaded portion 30 of the threaded fasteners 20.

The assist strap 12 is secured to the panel 14 by the fastening system 10 as follows. The escutcheon 22 is placed over the end 13 of the assist strap 12 so that the openings in the escutcheon 22 are aligned with the openings 15 in the assist strap 12. Thereafter, the threaded fasteners 20 are inserted through the openings in the escutcheon 22 and the openings 15 in the assist strap 12 and into the openings 32 in the panel 14. The threaded fasteners are rotatively driven by a screw-driving machine or the like so that the threads on the threaded portion 30 of fasteners 20 cut threads in the backing 18 at the openings 32. The threaded fasteners 20 are driven until the surfaces 26 mate with the surfaces 28. As the surfaces 26 mate with the surfaces 28, the ridges in the surfaces 26 "cam" over the ridges in the surfaces 28 until a predetermined driving torque is reached. The predetermined driving torque is established so that the surfaces 26 are well-mated with the surfaces 28 and so that there is substantial resistance to reverse rotation of the fasteners 20 provided by the "camming" effect attributable to the configuration of the respective surfaces 26 and 28.

Figure 2:
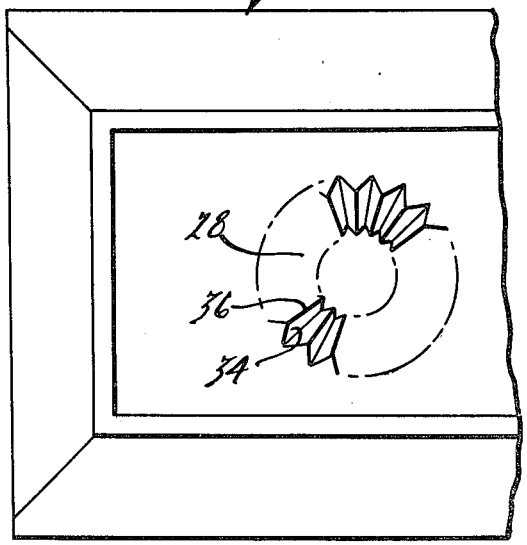
FIG. 2 is a top view of an escutcheon shown in FIG. 1.

In FIG. 2, a portion of escutcheon 22 is shown to better illustrate the locking surface 28. The escutcheon 22 may be formed from an injection-molded plastic or a die-case metal. As will be appreciated by those skilled in the art, injection molded plastics and die cast metals are relatively soft compared to the materials used in threaded fasteners 20. Consequently, the material of the escutcheon 22 can be readily abraded or eroded by articles having the hardness of the fasteners 20.

The surface 28 features relatively-deep grooves or recesses 34. Of course, the relatively-deep grooves or recesses 34 provide contiguous corresponding peaks or ridges 36. The depth of the grooves or recesses 34 relative to the ridges or peaks 36 may be approximately 0.050 of an inch but may be varied between 0.010 and 0.100 of an inch depending upon the size of the fastener and the material of the escutcheon. The included angle of the walls of the peaks or ridges 36 and the grooves or recesses 34 may be approximately 90°, but may be varied between 45° and 135°. Preferably, when the fastener 20 abuts a relatively-soft material such as an injection-molded plastic or die-cast metal, the ridges and recesses are slightly rounded as illustrated.

Figure 3:
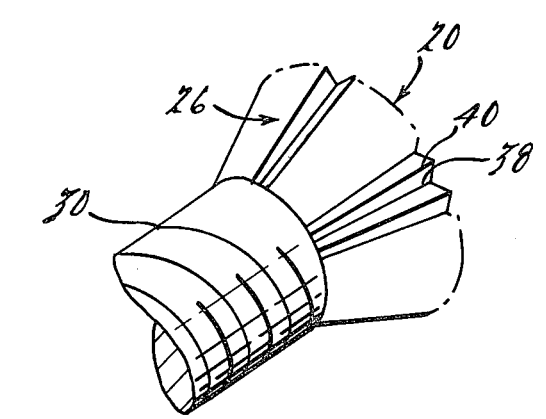
FIG. 3 is a perspective view of a flat-headed threaded fastener shown in FIG. 1.
Figure 4:
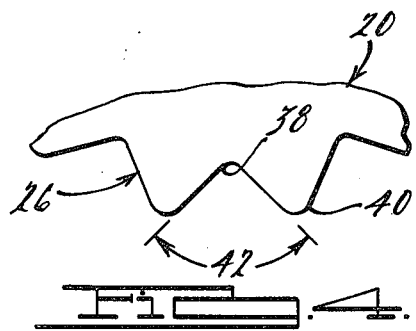
FIG. 4 is a partial, top view of the flat-headed threaded fastener shown in FIG. 3.

In FIG. 3, the fastener 20 is illustrated in greater detail. In FIG. 3, the recesses or grooves 38 and the peaks or ridges 40 of the surface 26 can best be seen. The recesses or grooves 38 and the peaks or ridges 40 have dimensions and included angles on their surfaces which are correlative to, and approximately the same as, the recesses 34 and ridges 36 of the mating surface 28. These relationships are better seen in FIG. 4 in which the included angle 42 of the surfaces of the peaks 40 and the recesses 38 is illustrated. Also, in FIG. 4, the slight rounding of the peaks 40 and recesses 38 can best be seen. The recesses 34 and peaks 36 of the escutcheon 22 are similarly rounded. Note that the recesses 34 and 38 and the peaks 36 and 40 are elongated and extend radially. Alternatively, the recesses 34 and 38, and the corresponding peaks 36 and 40, may not be elongated, but rather, can have a relatively short configuration, or can even have a conical or pyramid configuration. The configuration may be altered so long as a substantial increase in the resistance to rotation of the fastener 20 is provided by the mating engagement of the recesses 34 and 38 and peaks 36 and 40 relative to a fastener having smooth mating surfaces. Note also that the sidewalls of the recesses 34 and the peaks 36 of the escutcheon 22 as well as the sidewalls of the recesses 38 and the peaks 40 of the fastener 20 are each substantially equidistant. Although such a configuration is preferred to permit backing out and removal of the fasteners 20, for example, to permit replacement of the assist strap 12, alternatively, the sidewalls may be of different length to form a saw-tooth pattern which more readily allows rotation of the fasteners 20 in the fastening direction than in the loosening direction.

The recesses 34 and peaks 36 in the escutcheon 22 are provided when the escutcheon 22 is molded. Accordingly, the only modification needed to provide the recesses 34 and ridges 36 is an alteration of the mold at the surfaces 28. Except for the cost of altering the mold for the escutcheon 22, for all practical purposes, there is no additional cost associated with the escutcheon 22 which is required in order to implement the fastening system 10. For new applications in which new tooling is being designed and constructed, any additional cost is so small so as to be negligible on a piece price basis. The recesses 38 and the ridges 40 in the threaded fastener 20 are provided when the head portion 26 of the fastener 20 is formed, e.g., by a heading machine. The die surface of the heading machine must be modified to provide the recesses 38 and the ridges 40. Except for the cost of this modification of the die of the heading machine, for all practical purposes, there is no added cost associated with the implementation of the fastening system 10 with respect to the manufacture of the threaded fastener 20. Finally, during the assembly of the assist strap 12 and the fastening system 10, no additional parts or labor is required. It is preferred, however, to increase the torque of the screwdriver which drives the fasteners 20 to accommodate the additional torque required to fully seat the fasteners 20 and overcome the "camming" effects of the recesses and ridges on the escutcheon 22 and the threaded fasteners 20. It will therefore be appreciated that the fastening system 10 can be implemented with minimal additional cost and with no increase in the number of parts which constitute the fastening system.

In FIG. 5, an alternate embodiment of the present invention is illustrated. In the Figure, a like fastening panel 14 including a decorative covering 16 and a metal backing plate or surface 18 is illustrated. Similarly, openings 32 are provided to receive the threaded fasteners which secure the assist straps.

In FIG. 5, an assist strap 44 is illustrated which is similar to the assist strap 12 except that the fastening system 46 therefor is somewhat modified relative to the fastening system of FIG. 1. In FIG. 5, the fastening system 46 according to the present invention comprises round-headed fasteners 48 and protrusions 50 formed in the end portion of the metal strap 52. The metal strap 52 extends the length of the assist strap 44. A two-piece escutcheon is used having a base portion 54 and a cover portion 56. Prior to the assembly of the assist strap 44 to the panel 14, the end 52 of the metal strap is secured to the base 54 of the escutcheon by means of a rivet 58 or other fastener. The base 54 has openings in alignment with openings 60 in the end 52. The fasteners 48 project through the openings in the base 54 and the openings 60 to threadedly engage the openings 32 in the panel 14. The base 54 also has a pair of flanges 62 which engage and secure the cover 56 (by means of corresponding flanges on the cover which are not shown). The base 54 has a bridge portion 64 which engages and blends with the exterior surface of the cover 56 to provide an attractive exterior appearance.

In the fastening of the assist strap 44 to the panel 14 using the alternate embodiment 46 of a fastening system according to the present invention, the assist strap 44 with the preassembled escutcheon base 54 is placed against the panel 14 with the openings 60 in the strap end 52 in alignment with the openings 32 in the panel 14, and thereafter, the threaded fasteners 48 are inserted through the openings 60 and into the openings 32. The threaded fasteners 48 are then driven to a predetermined torque as previously described. Finally, the escutcheon cover 56 is snapped over the escutcheon base 54 to complete the assembly.

As best seen in FIG. 6, the round-headed threaded fastener 48 is provided with a threaded portion 66 and a head portion 68. The head portion 68 has a generally-annular underlying surface 70 which is provided with relatively deep recesses or grooves 72. The recesses or grooves 72 define intermediate peaks or ridges 74. The recesses or grooves 72 and the peaks or ridges 74 have dimensions which are essentially the same as the dimensions of the recesses or grooves 34 and the peaks or ridges 36. For example, the depth of the grooves or recesses 72 relative to the peaks or ridges 74 may be approximately 0.050 of an inch but may be varied between 0.010 and 0.100 of an inch depending upon the size of the fastener and the material of the escutcheon. However, since the fasteners 48 engage the relatively hard material of the attachment end of the strap 52, the ridges 74 and grooves 72 are relatively sharp as illustrated. In this regard, the strap 52 is normally fabricated of steel.

In FIG. 7, an enlarged view of the attachment end of the strap 52 is shown to illustrate the surface 50 which surrounds the opening 60 in the strap end 52. The surface 50 comprises grooves or recesses 76 and peaks or ridges 78 which are formed into the strap 50 prior to assembly with the escutcheon base 54. Preferably, the grooves 76 and the ridges 78 are formed at the same time as the openings 60 are formed using a punching/stamping step. Alternatively, the openings 60 and the grooves 76 and the ridges 78 can be formed in sequential punching and stamping steps. The grooves 76 and the ridges 78 of the strap 52 have dimensions which are substantially correlative to the dimensions of the grooves 72 and the ridges 74 in the fastener 48. Alternatively, the recesses 72 and 76 and the peaks 74 and 78 may have other configurations as previously described.

Except for the cost of altering the tooling for the strap end 52, and the cost of altering the tooling for the fasteners 48, for all practical purposes, there is no additional cost associated with the fastening system 46 according to the present invention. In the case of new application in which tooling has not yet been designed and constructed, any additional costs are so small as to be negligible on a piece price basis. Moreover, as was the case with the fastening system 10, no additional parts or steps are required in the assembly of the assist strap 44 to the panel 14. Likewise, the torque of the screwdriver which drives the fasteners 48 should be increased to accommodate the additional torque required to fully seat the fasteners 48 and to overcome the "camming" effects of the recesses and bridges on the strap end 52 and the threaded fasteners 48.

In view of the above description of this invention, it can be seen that an efficient, yet effective, solution is provided to the long standing problem of assist strap fasteners which loosen with use. Furthermore, it will be appreciated that the solution of this invention is elegant in its simplicity and is readily implemented at little additional cost in the fastener structure. Accordingly, it is believed that the present invention is an important advance in assist strap fastening systems.

It is to be understood that the foregoing description is that of preferred embodiments of the invention. Various changes and modifications may be made by one skilled in the art without departing from the spirit and scope of the invention as defined by the appended claims.

What is claimed is:

1. A fastening system for fastening assist straps and the like to a panel or other member comprising:
    an escutcheon for said strap;
    a threaded fastener having a first surface which engages said escutcheon to fasten said assist strap, said first surface having recesses and peaks;
    said escutcheon having a second surface which engages said first surface of said fastener, said second surface having recesses and peaks which are correlative to said peaks and recesses, respectively, of said fastener so that the peaks of one of said surfaces reside in the recesses of the other of said surfaces when said surfaces are engaged.

2. A fastening system according to claim 1 wherein said recess on said first and second surfaces are elongated grooves and said peaks on said first and second surfaces are elongated ridges.

3. A fastening system according to claim 1 wherein said recesses on said first and second surfaces and said peaks on said first and second surfaces are substantially triangular in configuration.

4. A fastening system according to claim 3 wherein said triangular recesses and peaks on said first and second surfaces have substantially equidistant sides.

5. A fastening system according to claim 1 wherein said recesses and peaks on said first and second surfaces are rounded.

6. A fastening system according to claim 1 wherein said first surface is substantially conical in configuration and said second surface has a corresponding substantially conical configuration.

7. A fastening system according to claim 1 wherein, except for said peaks and recesses, said first surface is substantially flat and said second surface is also substantially flat.

8. A fastening system for fastening assist straps and the like to a panel or other member comprising:
- a metal band extending through the length of said assist strap having an end;
- a threaded fastener having a first surface which engages said end of said metal band to fasten said assist strap, said first surface having recesses and peaks;

said end of said metal band being formed by stamping to provide a second surface which engages said first surface of said fastener, said second surface having recesses and peaks which are correlative to said peaks and recesses, respectively, of said fastener so that the peaks of one of said surfaces reside in the recesses of the other of said surfaces when said surfaces are engaged.

* * * * *